(12) United States Patent
DeBoni

(10) Patent No.: US 6,304,804 B1
(45) Date of Patent: Oct. 16, 2001

(54) SYSTEM AND METHOD FOR VEHICLE DIRECTION SIGNALING USING AN ACCELEROMETER FOR CANCELLATION CONTROL

(75) Inventor: Albert W. DeBoni, Shelby Township, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/452,628

(22) Filed: Dec. 1, 1999

(51) Int. Cl.[7] ........................................................ G06F 7/00
(52) U.S. Cl. ............................ 701/36; 307/121; 340/476; 200/61.45 R
(58) Field of Search ................................... 701/36, 45, 46, 701/70; 307/9.1, 112, 119–121; 340/475, 476, 425.5, 429, 440, 463, 467; 200/52 R, 52 A, 61.27, 61.3, 61.45 R, 61.52

(56) References Cited

U.S. PATENT DOCUMENTS

| | | |
|---|---|---|
| 3,876,976 | 4/1975 | Cross, Jr. ............................... 340/476 |
| 3,931,529 | 1/1976 | Williamson, Jr. ....................... 340/476 |
| 4,213,116 * | 7/1980 | Holtzman et al. ...................... 340/476 |
| 4,363,022 | 12/1982 | Manacci ................................ 200/52 A |
| 4,384,269 * | 5/1983 | Carlson ................................. 340/467 |
| 4,398,175 | 8/1983 | Gamba .................................. 340/476 |
| 4,723,078 * | 2/1988 | Neuffer et al. ......................... 340/436 |
| 4,843,368 * | 6/1989 | Poulos .................................. 340/464 |
| 5,663,706 * | 9/1997 | Francis ................................. 340/464 |

* cited by examiner

*Primary Examiner*—William A. Cuchlinski, Jr.
*Assistant Examiner*—Edward Pipala
(74) *Attorney, Agent, or Firm*—Tarolli, Sundheim, Covell, Tummino & Szabo L.L.P.

(57) ABSTRACT

A direction signaling system (12) for a vehicle (10) includes left and right signaling units (16–22) that are operable for indicating intended turning movements of the vehicle. A module (26) controls selective operation of the signaling units (16–22) and controls cancellation of signaling unit operation. The module (26) includes an accelerometer (e.g., 38) for sensing vehicle acceleration. A processor (50) of the module (26) determines if the sensed acceleration is indicative of a need to cancel signaling unit operation and cancels signaling unit operation in response to the determination.

11 Claims, 4 Drawing Sheets

SYSTEM AND METHOD FOR VEHICLE DIRECTION SIGNALING USING AN ACCELEROMETER FOR CANCELLATION CONTROL

TECHNICAL FIELD

The present invention is related to direction signaling systems for vehicles, and is particularly related to systems that have an automatic cancellation feature for ceasing a turn signal indication.

BACKGROUND OF THE INVENTION

Vehicles, such as motorcycles, have direction signaling systems. An operator of a vehicle utilizes a direction signaling system of the vehicle to indicate intended turning movement of the vehicle. Typically, a signaling system includes a manually actuatable selector that is operated to activate the signaling system to provide either a right turn indication or a left turn indication.

For a vehicle, such as a automobile, with a steering member (e.g., a steering wheel) that is rotated a significant amount (e.g., plural rotations) to accomplish a steering maneuver, cancellation of a turn indication can easily be accomplished by monitoring steering wheel rotation. Motorcycles typically do not include a steering member that has such a relatively large range of travel that occurs during a steering maneuver. Often, a steering maneuver on a motorcycle can be accomplished with little or no movement of a steering handlebar of the motorcycle. Thus, for motorcycles, it is common to have a signaling system that requires manual cancellation (i.e., a manual movement of a selector switch).

Also, it is known to utilize a timing mechanism within a direction signaling system on a motorcycle for canceling a turn indication after a predetermined time period. Further, it is known to use a mechanical tilt switch within a motorcycle direction signaling system to obtain cancellation of a turn indication. The use of a tilt switch has some merit because a motorcycle will often be tilted and then returned to an upright orientation during a steering maneuver.

However, the above-mentioned turn indication cancellation features for motorcycles have shortcomings. Reliance upon manual cancellation has the associated detraction that the operator may forget to manually cancel the indication. Use of a timer, per se, could result in an indication period that is either less than or greater than a period in which the motorcycle operator wishes the indication to occur. Mechanical tilt switches may be ineffective in canceling all turn indications. This would be true if the turn is accomplished without sufficient tilting of the motorcycle to move a mechanical tilt switch.

SUMMARY OF THE INVENTION

In accordance with one aspect, the present invention provides a direction signaling system for a vehicle. Left and right signaling units are operable for indicating intended turning movements of the vehicle. Operation means selectively operate the signaling units. Cancellation means cancels signaling unit operation. The cancellation means includes an accelerometer for sensing vehicle acceleration. The cancellation means includes means for determining if the sensed acceleration is indicative of a need to cancel signaling unit operation. The cancellation means includes means for canceling signaling unit operation in response to the determination.

In accordance with another aspect, the present invention provides a method of direction signaling for a vehicle. Either a left or a right signaling unit is selected for operation to indicate an intended turning movement of the vehicle. The selected signaling unit is operated. Vehicle acceleration is sensed. A determination is made as to whether the sensed acceleration is indicative of a need to cancel signaling unit operation. Signaling unit operation is canceled in response to the determination.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
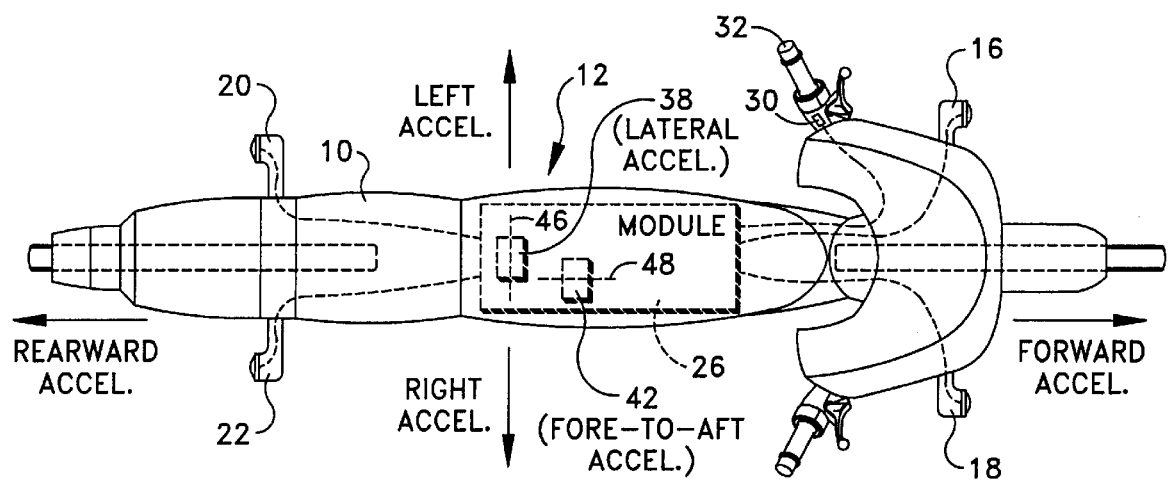
FIG. 1 is a top view of a motorcycle that incorporates a signaling system in accordance with the present invention.

A vehicle 10 that incorporates a direction signaling system 12 in accordance with the present invention is shown in FIG. 1. Preferably, the vehicle 10 is a motorcycle 10. Four signaling units 16–22 are located on the motorcycle 10. Toward the front of the motorcycle 10 are front left and right signaling units 16 and 18, respectively. Located toward the rear of the motorcycle 10 are rear left and right signaling units 20 and 22, respectively. Preferably, each of the signaling units 16–22 includes an electrically energizable light bulb that is enclosed within a housing that has an amber or red lens.

Figure 2:
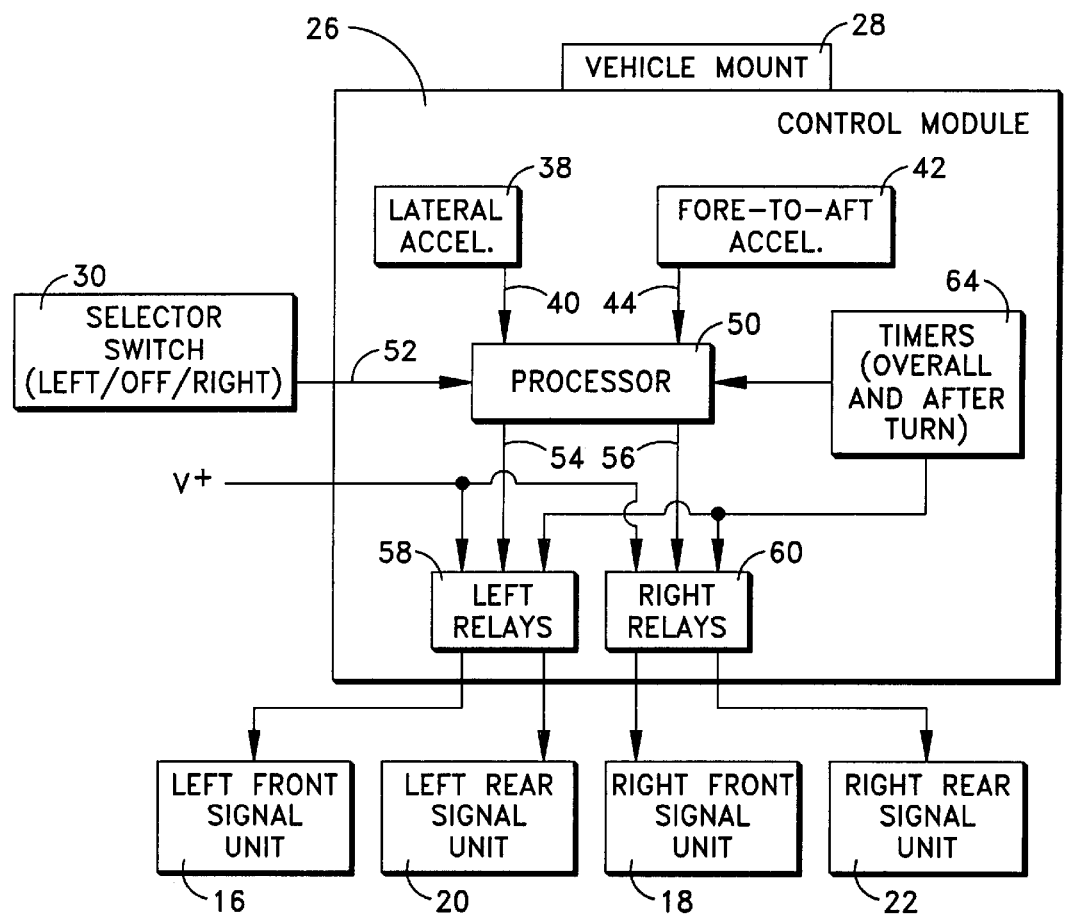
FIG. 2 is a function block diagram of the system shown in FIG. 1.
Figure 3:
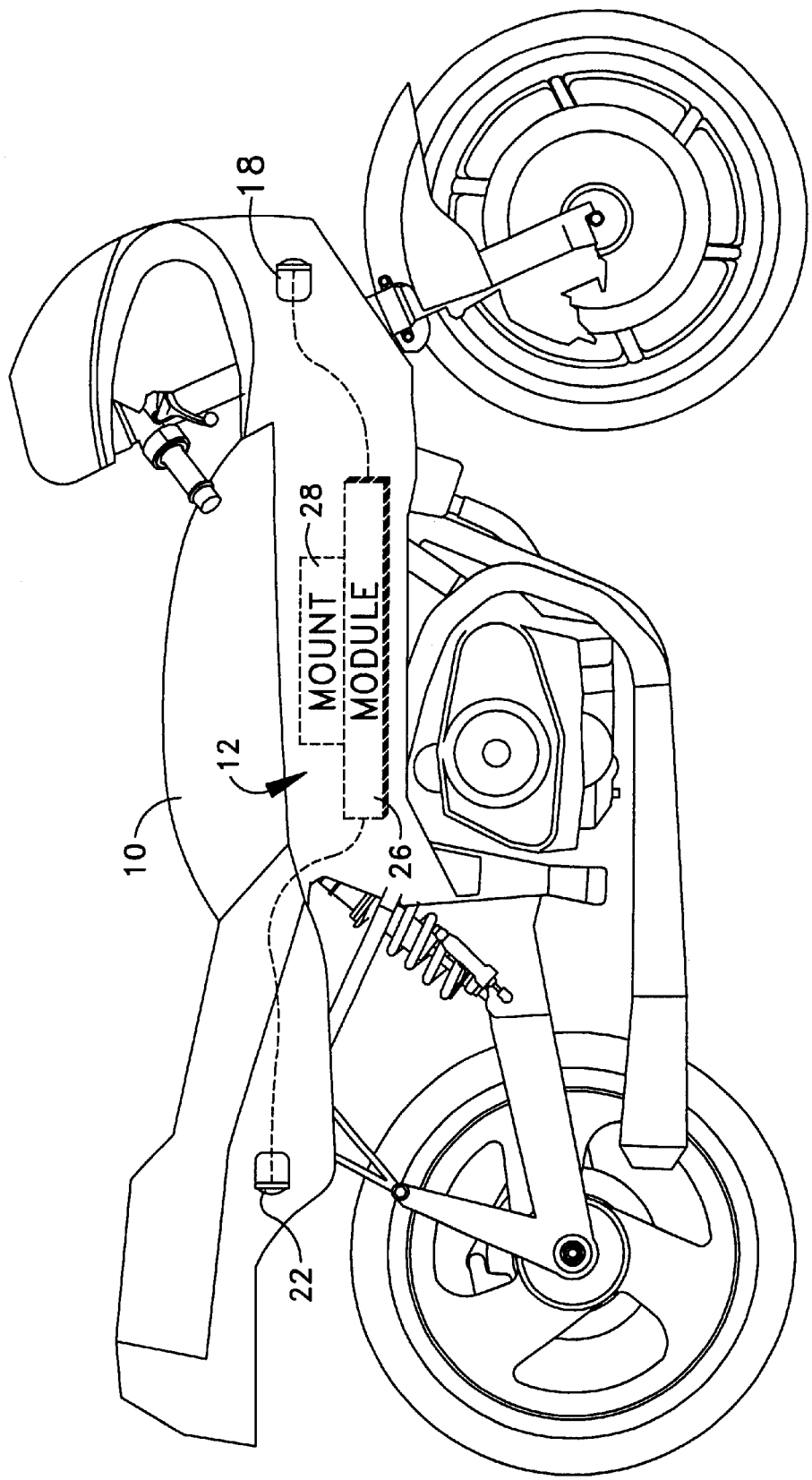
FIG. 3 is a side view of the motorcycle shown in FIG. 1.

A module 26 (FIG. 2) of the system 12 selectively provides electrical energy to the signaling units 16–22 such that the light bulbs are energized and provide an indication to an observer (not shown) of the motorcycle 10. The module 26 (FIG. 3) is fixed to a mount 28 (e.g., part of a frame) of the motorcycle 10 and electrical energy is provided by a power supply V+ (FIG. 2, e.g., a battery) of the motorcycle. The module 26 is shown in FIGS. 1 and 3 in a disproportionate size and at a convenient location for the purpose of ease of illustration. The size and location of the module 26 shown in FIGS. 1 and 3 should not be construed as a limitation on the invention.

A selector switch 30 (FIG. 1) is provided on a handlebar 32 of the motorcycle 10 for providing operator input to the module 26. The switch 30 may take any suitable form that is manually actuatable by an operator (not shown) to select either a left turn indication or a right turn indication. Also, the switch 30 is manually actuatable to an "OFF" setting wherein neither left nor right indications are provided. In one example, the switch 30 has a member that is movable between a center-neutral "OFF" position, a left position, and a right position. In another embodiment, the switch 30 includes a plurality (e.g., three) of actuatable members that are provided for the operator to select the left turn indication, the right turn indication, or the cessation of an indication (i.e., the "OFF" setting).

The module 26 (FIG. 2) has means for controlling cancellation of the indication provided by the signaling units. In accordance with the present invention, the means for canceling operation include at least one accelerometer (e.g., 38) that outputs a signal (e.g., 40) indicative of acceleration of the motorcycle 10. The sensed acceleration is utilized in the control, and particularly cancellation control, of signaling unit operation.

In the example shown in the Figures, there are two accelerometers 38 and 42 that output respective signals 40 and 44. Each of the two accelerometers 38, 42 outputs its respective signal 40, 44 to have a signal characteristic (e.g., voltage, frequency) indicative of sensed acceleration. The first accelerometer 38 (FIG. 1) is oriented to be a lateral accelerometer. In other words, the first accelerometer 38 senses acceleration force (i.e., acceleration to the left or right) along a lateral (i.e., left-to-right) axis 46 of the motorcycle 10. The second accelerometer 42 is oriented to be a fore-to-aft accelerometer and sense acceleration force (i.e., acceleration forward or rearward) along a fore-to-aft (i.e., longitudinal) axis 48 of the motorcycle 10.

In accordance with the present invention, when a sensed acceleration is indicative of a need to cancel signaling unit operation, the module 26 cancels signaling unit operation. Turning attention to FIG. 2, details of the module 26 are shown. A processor 50 of the module 26 receives input 52 from the manual switch 30. The first and second accelerometers 38 and 42 are also connected to provide their signals 40 and 44 as inputs to the processor 50.

The processor 50 makes determinations regarding turn signal indications and outputs signals 54 and 56 to left and right relay units 58 and 60. The left relay unit 58 is, in turn, operatively connected to the left signaling units 16 and 20, accordingly. The right relay unit 60 is, in turn, operatively connected to the right signaling units 18 and 22, accordingly. The relay units 58 and 60 provide for a selective ON/OFF cadence of energizing the light bulbs of the associated left and right signaling units 16–22. A timer unit 64 is provided within the module 26 to provide default time periods used for operation of the signaling units 16–22.

When the operator of the motorcycle 10 actuates the switch 30 to input a desired turn indication (e.g., a right turn indication) request, the processor 50 provides a signal to the appropriate relay unit (e.g., the right relay unit 60). The processor 50 also commands the timer unit 64 to initiate an overall timer function. The overall timer function operates to terminate the signal indication after a predetermined (e.g., preprogrammed) time period. In one embodiment, the predetermined amount of time associated with the overall timer function is slightly greater than the expected time within which a turn maneuver is to be completed.

Once the operator actuates the switch 30 to input the desired turn indication request and the overall timer is proceeding, the processor 50 begins to monitor the acceleration indicative signals 40 and 44 provided by the first (lateral) accelerometer 38 and the second (fore-to-aft) accelerometer 42. In particular, if the lateral acceleration rises above a predetermined threshold value (herein referred to as a turn threshold), the processor 50 interprets the lateral acceleration rise as an indication that the turn maneuver has begun. Subsequently, if the lateral acceleration falls below the turn threshold, the processor 50 interprets the reduction in lateral acceleration as an indication that the turn maneuver is proceeding toward conclusion.

In response to the indication that the turn maneuver is proceeding toward conclusion, the processor 50 commands the timer unit 64 to initiate an after-turn timer function such that the turn signal indication will soon be terminated. Specifically, the after-turn timer function provides for a relatively short time period within which the turn indication is continued and then canceled (i.e., terminated) upon expiration of the time period provided by the after-turn timer function. Thus, the cancellation of the turn indication is responsive to the reduction in lateral acceleration (as an indication that the turn maneuver is proceeding toward conclusion), but the system 12 awaits conclusion of the short time period before the actual cancellation of the turn indication occurs.

However, if the acceleration signal 44 provided by the second (fore-to-aft) accelerometer 42 indicates acceleration above a certain threshold value, the processor 50 stops or stays the after-turn timer function (i.e., the after-turn timer does not decrement). Such a condition occurs when the motorcycle 10 is accelerated forward. The stay of the after-turn timer function ceases once the fore-to-aft acceleration falls below the certain threshold value.

Eventually, once the after-turn timer has proceeded to expiration (e.g., the after-turn timer has decremented down to zero), the turn indication is cancelled. Similarly, if the overall timer has eventually proceeded to expiration (e.g., decremented down to zero), the turn indication is cancelled. Thus, the overall timer function provides a back-up to the acceleration-based cancellation of the indication.

Of course, the operator has the option of terminating a turn indication by merely actuating the switch 30 to the "OFF" setting. In a preferred embodiment, the turn indication ceases immediately when the operator actuates the switch 30 the "OFF" setting. Any unexpired timers are merely ignored and reset as needed.

Figure 4:
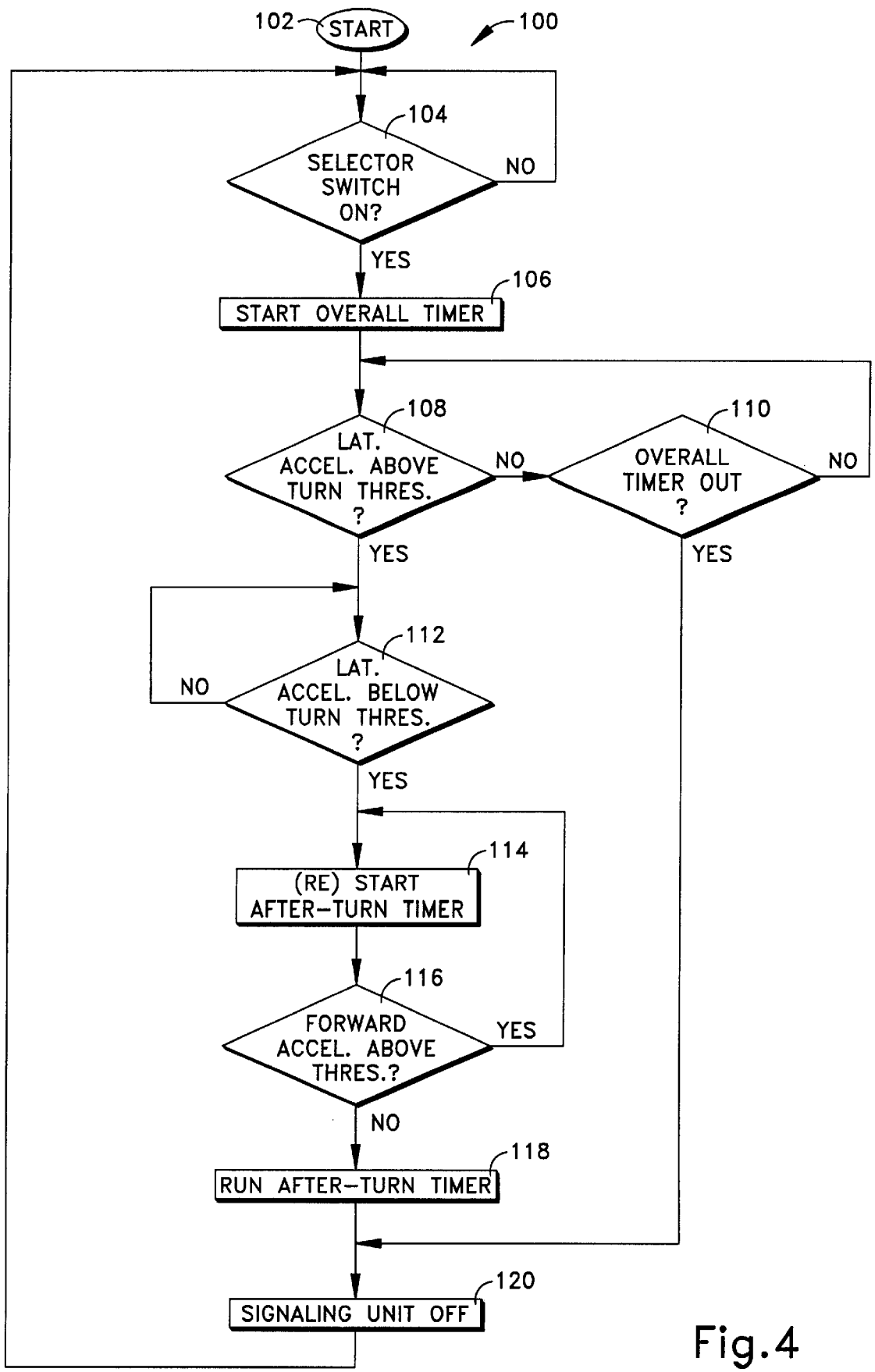
FIG. 4 is a flow chart for a process performed within a processor shown in FIG. 2.

An example turn indication provision and cancellation control process 100 performed by the processor 50 is shown in a flow chart of FIG. 4. The process 100 begins at step 102 and proceeds to step 104. At step 104, it is determined whether the switch 30 has been manually actuated from the "OFF" setting to either the left or right setting. If the determination at step 104 is negative (the operator has not actuated the switch 30 to request a turn indication), the process 100 continues to loop and perform step 104. However, if the determination at step 104 is affirmative (i.e., the operator has actuated the switch 30 as a request to provide an indication), the process 100 proceeds to step 106.

At step 106, the overall timer function of the timer unit 64 is initiated. At step 108, lateral acceleration, as indicated by the signal 40 from the first accelerometer 38), is monitored to determine if the lateral acceleration exceeds the turn threshold. If the determination at step 108 is negative, the process 100 proceeds to step 110 to determine if the overall timer has expired (i.e., timed-out). If the determination at step 110 is negative (i.e., the overall timer has not yet expired), the process 100 loops back to step 108.

If the determination at step 108 is affirmative (i.e., the lateral acceleration is above the turn threshold), the process 100 proceeds to step 112. At step 112, it is determined whether the lateral acceleration has fallen below the turn threshold (i.e., the turn maneuver is ending). If the determination at step 112 is negative (i.e., the lateral acceleration is still above the turn threshold), the process 100 continues to repeat the step 112. However, if the determination at step 112 is affirmative (i.e., the lateral acceleration has fallen below the turn threshold), the process 100 proceeds to step 114.

At step 114, the after-turn timer is started. At step 116, it is determined whether the forward acceleration, as indicated via the signal 44 from the second accelerometer 42, is above the predetermined threshold. If the determination at step 116 is affirmative (i.e., the forward acceleration is above the threshold), the process 100 loops back to repeat step 114. In other words, the after-turn timer is restarted. This has the affect of staying performance (i.e., waiting) for a period before permitting the after-turn timer to proceed toward expiration (e.g., decrementing to zero).

When the determination at step 116 is negative (i.e., the forward acceleration is below the associated threshold), the process 100 proceeds to step 118. At step 118, the after-turn timer is permitted to proceed toward expiration. Upon completion of step 118, the process 100 proceeds to step 120 where the turn indication is cancelled. A similar result will occur if step 110 is reached and the determination at step 110 is affirmative (i.e., the overall timer has decremented down to zero). Upon completion of step 120, the process 100 loops to step 104 to again make a determination regarding switch activation.

It is to be appreciated that in the example process shown in FIG. 4, the actuation of the switch 30 to the "OFF" setting acts as an interrupt. At any point during the process 100, if the switch 30 is actuated "OFF", the turn indication that currently is occurring is terminated and the process 100 stops. The process 100 then restarts at step 102. It is to be understood that the flow chart shown in FIG. 4 could show additional steps of determinations regarding actuation of the switch 30 to the "OFF" setting to accomplish the same concept of terminating the current turn indication.

As an additional feature provided by the system 12 of the present invention, fore-to-aft acceleration is utilized to provide additional signaling. Specifically, signaling other than left and right turn indications is provided in response to certain sensed fore-to-aft acceleration. In the example set forth herein, the system 12 provides for an indication of deceleration of the motorcycle 10 that exceeds a predetermined threshold. A determination of deceleration exceeding the predetermined threshold is made within the processor 50 via monitoring the signal 44 output by the second (fore-to-aft) accelerometer 42.

When the motorcycle is experiencing deceleration above the predetermined threshold, the rear left and right signaling units 20 and 22 provide signal indications other than turn indications. Examples of indications for deceleration include simultaneous illumination or simultaneous flashing (i.e., alternating ON and OFF).

Figure 5:
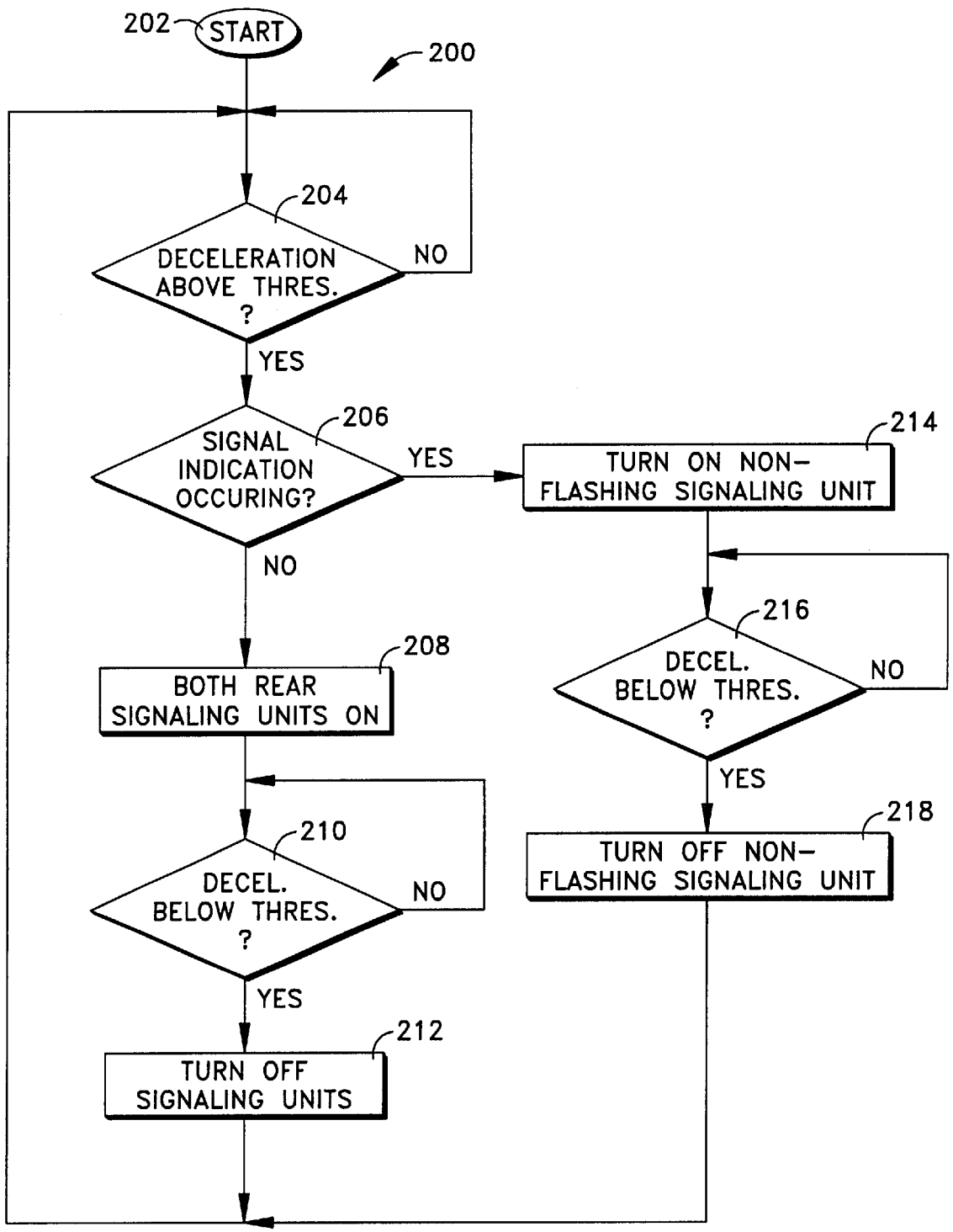
FIG. 5 is a flow chart for another process performed within the processor of FIG. 2.

FIG. 5 is a flow chart of an example of a process 200 that is performed within the processor 50 for providing the deceleration indications. Preferably, the process 200 would cooperate, and be performed in conjunction, with the process 100 of FIG. 4. The process 200 (FIG. 5) begins at step 202, and proceeds to step 204. At step 204, it is determined if the sensed deceleration, as indicated by the signal 44 from the second accelerometer 42, is above a predetermined threshold value.

If the determination at step 204 is negative (i.e., deceleration of the motorcycle is below the predetermined threshold value), the process 200 repeats step 204. If the determination at step 204 is affirmative (i.e., deceleration is above the predetermined threshold value), the process 200 proceeds to step 206. At step 206, it is determined if a turn indication is currently in progress (i.e., determine whether the left signaling units 16, 20 or the right signaling units 18, 22 are being energized in the ON/OFF cadence).

If the determination at step 206 is negative (i.e., a turn indication is currently not in progress), the process 200 proceeds to step 208. At step 208, both (i.e., left and right) rear signaling units 20 and 22 are energized. Preferably, the energization is continuous (i.e., steady state and not an ON/OFF cadence), similar to a brake light. This provides a warning to an observer following the motorcycle 10 that the motorcycle is decelerating.

At step 210, it is determined whether the deceleration of the motorcycle 10 has dropped below the predetermined threshold value. If the determination at step 210 is negative (i.e., the motorcycle 10 is still experiencing deceleration above the threshold), the process 200 repeats step 210 and the deceleration indication is maintained. If the determination at step 210 is affirmative (i.e., the motorcycle deceleration has dropped to below the threshold), the process 200 proceeds to step 212 where the deceleration indication is terminated. Upon completion of step 212, the process 200 loops to step 204 to again make a determination regarding motorcycle deceleration.

If the system 12 had been providing a turn indication at the time that motorcycle deceleration exceeded the predetermined threshold, the determination at step 206 would be affirmative. Upon the affirmative determination at step 206, the process 200 proceeds to step 214. At step 214, the rear signaling unit that is not currently providing a turn indication (i.e., the non-flashing signaling unit) is energized. The energizing is preferably an ON/OFF cadence, thus, both signaling units are providing a "flash" ON and OFF. This provides an indication of motorcycle deceleration and also that a turn is anticipated.

At step 216, it is determined whether the motorcycle deceleration has dropped below the predetermined threshold value. If the determination at step 216 is negative (i.e., the motorcycle is still experiencing deceleration above the threshold), the process 200 repeats step 216 and the deceleration indication is maintained. If the determination at step 216 is affirmative (i.e., the motorcycle deceleration has dropped to below the threshold), the process 200 proceeds to step 218 where the rear signaling unit ceases to be energized to provide the deceleration indication. Upon completion of step 218, the process 200 loops to step 204 to again make a determination regarding deceleration.

From the above description of the invention, those skilled in the art will perceive improvements, changes and modifications. Such improvements, changes and modifications within the skill of the art are intended to be covered by the appended claims.

Having described the invention, the following is claimed:

1. A direction signaling system for a vehicle, said system comprising:

left and right signaling units operable for indicating intended turning movements of the vehicle;

operation means for selectively operating said signaling units;

cancellation means for canceling signaling unit operation, said cancellation means including a first accelerometer for sensing vehicle acceleration along the lateral axis, means for determining if the sensed acceleration is indicative of a need to cancel signaling unit operation, and means for canceling signaling unit operation in response to the determination; and modification means for modifying the operation of the signal unit, including a second accelerometer, means for mounting said accelerometer to sense acceleration along a fore-to-aft axis, means for determining if the sensed acceleration along the fore-to-aft axis is indicative of a need to modify signal unit operation, and means for modifying signaling unit operation in response to the determination relating to sensed fore-to-aft acceleration.

2. A direction signaling system as set forth in claim 1, wherein said accelerometer includes means for outputting a signal that has a characteristic that varies in response to sensed acceleration.

3. A direction signaling system as set forth in claim 1, wherein said means for determining includes means for monitoring the signal characteristic.

4. A direction signaling system as set forth in claim 1, wherein said cancellation means includes means for awaiting a time period in response to the determination that the sensed acceleration is indicative of a need to cancel signaling unit operation, said means for canceling also being responsive to said means for awaiting to delay canceling signaling unit operation during awaiting the time period, said means for modifying signaling unit operation in response to the determination relating to sensed fore-to-aft acceleration includes means for changing a length of the time period.

5. A direction signaling system as set forth in claim 1, including means for determining if the sensed acceleration along the fore-to-aft axis is indicative of a need to provide a warning, means for operating said signaling units to provide a warning in response to the determination of the need to provide the warning.

6. A direction signaling system as set forth in claim 5, wherein said means for determining if the sensed acceleration along the fore-to-aft axis is indicative of a need to provide a warning includes means to determine of the sensed acceleration along the fore-to-aft axis is indicative of a vehicle deceleration above a predetermined threshold, said means for operating said signaling units to provide a warning includes means for operating both signaling units to provide the warning.

7. A method of direction signaling for a vehicle, said method comprising:

selecting either a left or a right signaling unit for operation to indicate an intended turning movement of the vehicle;

operating the selected signaling unit;

sensing vehicle acceleration along its lateral axis;

determining if the sensed acceleration is indicative of a need to cancel signaling unit operation;

canceling signaling unit operation in response to the determination;

sensing vehicle acceleration along the fore-to-aft axis;

determining if the sensed acceleration along the fore-to-aft axis is indicative of a need to modify signaling unit operation; and modifying signal unit operation in response to the determination relating to the sensed fore-to-aft acceleration.

8. A method as set forth in claim 7, including awaiting a time period in response to the determination that the sensed acceleration is indicative of a need to cancel signaling unit operation and canceling signaling unit operation after the time period.

9. A method as set forth in claim 7, said step of sensing vehicle acceleration includes outputting a signal, that has a characteristic that varies in response to sensed acceleration, from an accelerometer.

10. A method as set forth in claim 9, said step of determining includes monitoring the signal characteristic.

11. A method as set forth in claim 7, including determining if the sensed acceleration along the fore-to-aft axis is indicative of a need to provide a warning, and operating the signaling units to provide a warning in response to the determination of the need to provide the warning.

* * * * *